United States Patent [19]

Sontag

[11] Patent Number: 5,266,872
[45] Date of Patent: Nov. 30, 1993

[54] DEVICE FOR THE DUAL LOOP SERVO-CONTROL OF THE CUT-OFF VOLTAGE OF A CATHODE-RAY TUBE

[75] Inventor: Yves Sontag, Merignac, France

[73] Assignee: Sextant Avionique, Meudon la Foret, France

[21] Appl. No.: 933,218

[22] Filed: Aug. 21, 1992

[30] Foreign Application Priority Data

Aug. 30, 1991 [FR] France ............... 91 10801

[51] Int. Cl.$^5$ .............. G09G 1/04; H01J 31/26; H01J 29/70
[52] U.S. Cl. .................. 315/379; 315/10; 315/388
[58] Field of Search ............... 315/10, 379, 383, 387, 315/388

[56] References Cited

U.S. PATENT DOCUMENTS

| | | | |
|---|---|---|---|
| 4,602,272 | 7/1986 | Duschl | 315/10 |
| 4,705,992 | 11/1987 | Ciocan | 315/383 |
| 5,077,502 | 12/1991 | Shaklee et al. | 315/383 |
| 5,107,189 | 4/1992 | Page | 315/383 |

Primary Examiner—Gregory C. Issing
Attorney, Agent, or Firm—Cushman, Darby & Cushman

[57] ABSTRACT

The disclosure relates to cathode-ray tubes that have to be used at a low level of luminance. The cut-off voltage of the tube is modified by using two servo-control loops, the first one as a function of the value of the cathode current and the second one as a function of the luminance value of a zone that is located outside the operational image of the screen and consists of a particular luminophore. Selector means are used to change over from one loop to the other and vice versa as a function of the values of the cathode current and of the luminance of the zone with respect to certain predetermined thresholds.

19 Claims, 4 Drawing Sheets

DEVICE FOR THE DUAL LOOP SERVO-CONTROL OF THE CUT-OFF VOLTAGE OF A CATHODE-RAY TUBE

BACKGROUND OF THE INVENTION

1. Field of the Invention

The invention relates to cathode-ray tubes and, more particularly, to a device for the automatic modification of the cut-off voltage of a cathode-ray tube as a function of the luminance measured on the screen of the tube.

2. Description of the Prior Art

A cathode-ray tube 10 (FIG. 1) comprises in a chamber 11 under vacuum: a cathode 12 comprising a heated filament 16 that emits electrons and an anode 13 that is taken by means of a terminal 19 to a positive potential (HT) higher than the potential VK of the cathode so as to attract the electrons towards a surface 14 which constitutes the screen of the cathode-ray tube. The internal wall of the screen is coated with luminophores which get illuminated when they receive the electrons emitted by the cathode. This enables luminous FIGS. to be made to appear on the external wall of the screen by deflecting the path of the electrons, notably by means of variable magnetic fields given by deflection coils 15.

In order to achieve greater control over the path of the electrons and modulate the intensity of the electron beam, the electrons emitted by the cathode 12 go through a structure constituted by three electrodes or gates G1, G2 and G3 which are at potentials appropriate to their role. It is thus that the gate G1, better known as the Wehnelt gate, is positioned in the vicinity of the cathode and is at a negative potential VG1 in relation to this cathode so that it can stop or let through electrons going towards the screen. The gate G2, which is the so-called acceleration electrode, is placed in the vicinity of the gate G1 towards the screen and is at a positive potential VG2 with respect to the cathode. Finally, the gate G3, known as the focusing gate, is placed before the deflection coils 15 and is at a positive potential VG3 with respect to the cathode.

In FIG. 1, the potentials of the different cathodes are obtained schematically by potentiometers 17, 18 and 101. The potentiometer 17 is connected between a terminal at +100 volts for example and a terminal connected to the ground. The potentiometer 18 is connected between the ground and the high voltage (HT) equal to 16 kilovolts for example. The potentiometer 101 is connected between the ground and a potential of −200 volts.

The cathode 12 is connected to the output terminal of the potentiometer 17 and its potential VK can therefore vary from 0 to +100 volts. The Wehnelt gate G1 is connected to the output terminal of the potentiometer 101 and its potential VG1 may therefore vary from 0 to −200 volts. The accelerator gate G2 is connected to a first output terminal of the potentiometer 18 and its potential VG2 may therefore vary from 0 to several thousand volts. The focusing gate G2 is connected to a second output terminal of the potentiometer 18, and its potential VG3 may therefore reach several thousand volts.

It will be understood that the intensity of the electron beam and, hence, that of the luminous dot or spot on the screen can be modulated by the modification of the voltage VGK1. To this effect, the gate G1 is biased at a voltage Vco called a cut-off voltage, and a variable modulation voltage is applied to it to obtain a variable beam electron current and hence a variable luminance of the light dot on the screen.

The cut-off voltage Vco corresponds to the difference in potentials VKG1 which is just enough to prevent the passage of electrons towards the screen.

FIG. 2 is a graph showing the variation of the cathode current Ik which corresponds substantially to the luminance of the dot on the screen, as a function of the voltage VKG1 between the cathode and the gate G1. The curve 20, which is quasi-logarithmic, shows that the current Ik is zero for VKG1=Vco and that it reaches the value Iko for VKG1=0.

To obtain a linear characteristic between the signal applied to the gate G1 and the luminance on the screen, it is necessary, firstly, to linearize the curve 20 and, secondly, to hold the cathode-ray tube at its cut-off voltage in the absence of a modulation signal. This holding is all the more critical as the tube operates at low values of luminance, which it does when the cathode-ray tube is used in a dim environment.

To guarantee the stability of the low-level luminance, it is necessary:
 always to bias the tube at its cut-off voltage;
 to keep the voltage VKG2 stable between the cathode and the accelerator gate;
 to keep the heating power of the cathode stable, i.e. ensure a certain precision and stability of the voltage Vf which is applied to the heating filament 16;
 to keep the difference in potentials VKA between the cathode and the anode stable.

To resolve these problems, it has been proposed to bias the tube with voltages VKG2, Vf and VKA that are as constant as possible, but it is difficult to maintain these voltages with a precision higher than 1%.

Furthermore, the characteristics of the tube change:
 during the thermo-mechanical stabilization of the electron gun, when starting the system and
 in the course of ageing during the life of the tube.

The result thereof is that the bias voltages would have to be readjusted in the course of time.

To compensate for these drifts, devices have been proposed for the servo-control of the cut-off voltage of the tube by the measurement of the cathode current. This servo-control is done at regular intervals, for example during the frame flyback or retrace of the image, and its value is memorized during the next frame.

The acquisition of the servo-control value is done in two steps:
 a first step of applying, to the gate G1, a voltage greater than the cut-off voltage and for the measurement of the cathode leakage currents. The result of this measurement is subtracted from the measurement made in the second step and makes it possible to do away with the effects of the leakage currents;
 a second step of applying, to the tube, a low modulation voltage of a known value and for the servo-control of the potential VKG1 so as to measure a cathode current Ik which is the sum of the leakage currents measured during the first step and of a constant current Iks corresponding to the assumed value that would be generated by the desired value of modulation applied.

Such a method is satisfactory when the dynamic range of current is between 10 microamperes and 2 milliamperes, which corresponds to servo-control currents Iks that are appropriate when the minimum light conditions are what are known as drawing room conditions as is the case with television sets used by the general public.

When the tube is placed in a very dark environment and/or when it is very sensitive (because of the high output of the luminophores), the servo-control should be done at cathode current values far lower than one microampere. This is difficult to achieve because of the values of the insulation resistance and of the inter-electrode parasitic capacitances.

Furthermore, this prior art method does not take account of the variation of the sensitivity of the luminophores, namely their light output, in the course of time.

In the patent application filed on the same date by the Applicant, entitled: DEVICE FOR THE SERVO-CONTROL OF THE CUT-OFF VOLTAGE OF A CATHODE-RAY TUBE BY A MEASUREMENT OF LUMINANCE, a device is described wherein the screen of the tube comprises a zone, located outside the surface assigned to the operational image, that is coated with a luminophore preferably emitting in the invisible range. To this zone, there is assigned a photoelectric cell which detects the luminance of an associated surface when the electron beam of the tube is directed towards this surface by an appropriate deflection. At regular intervals, for example during the frame flyback, the tube is cut off and the luminance of the surface facing the cell is measured and compared with a desired value: the signal resulting from the comparison is used to modify the intensity of the electron beam, for example by modifying the cathode voltage in appropriate sense.

Such a device is satisfactory but calls for a precise positioning of the deflection of the electron beam and of the luminance sensor so that the surface of the luminophore excited by the beam is always facing the sensor irrespectively of the circumstances. Indeed, if this is not the case, the sensor will detect no luminance and the servo-control loop will have the effect of reducing the cut-off voltage: this would lead to an increase in the intensity of the electron beam to the extent where it could cause the destruction of the tube.

SUMMARY OF THE INVENTION

The object of the present invention, therefore, is to make a device for the automatic servo-control of the cut-off voltage of a cathode-ray tube of the optical measurement type, that prevents the above-mentioned malfunctioning.

The invention relates to a device for the servo-control of the cut-off voltage of a cathode-ray tube, the screen of which has at least a first operational zone of the tube used to make the images appear on the screen and a second zone positioned outside the first zone, said device comprising a luminance sensor that is positioned facing the second zone to measure the luminance of the associated surface of the second zone, scanning means to direct the electron beam of the tube, at certain chosen instants, towards said surface associated with the sensor and means to modify the cut-off voltage of the tube, wherein the last-named means further comprise:

a first servo-control loop to modify the cut-off voltage of the tube as a function of the value of the cathode current;

a second servo-control loop to modify the cut-off voltage of the tube as a function of the value of the luminance given by said luminance sensor, and selector means to change over from the first loop to the second loop and vice versa as a function of the values of the cathode current and of the luminance.

BRIEF DESCRIPTION OF THE DRAWINGS

Other objects, features and advantages of the present invention shall appear from the following description of a particular embodiment, made with reference to the appended drawings, of which.

MORE DETAILED DESCRIPTION

The invention consists in implementing two servo-control loops, one using a measurement of the cathode current Ik and the other using, as in the above-mentioned patent application, a measurement of the luminance of a zone of the screen coated with a luminophore having particular characteristics.

The servo-control on the measurement of the luminance will make it possible to obtain high precision. The information given by the measurement of the current Ik will make it possible to check the validity of the measurement of luminance. When the system is started up or in the event of malfunctioning of the luminance measuring sequence, the servo-control is done on the measurement of the current Ik.

Figure 7:
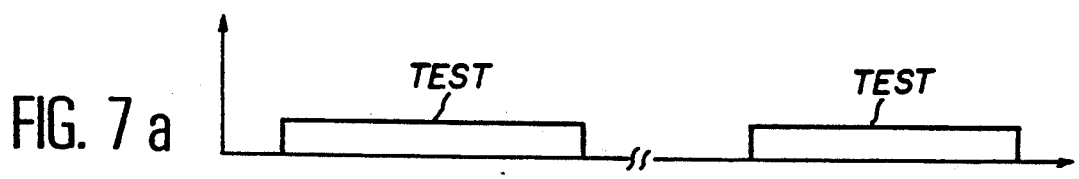
FIGS. 7a to 7d are graphs of different control signals of the device of FIG. 6.
Figure 7:
Figure 7:
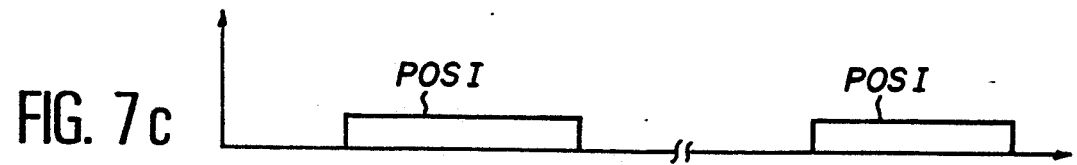
Figure 7:
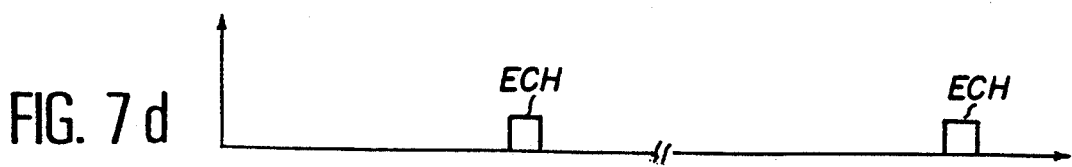
Figure 6:
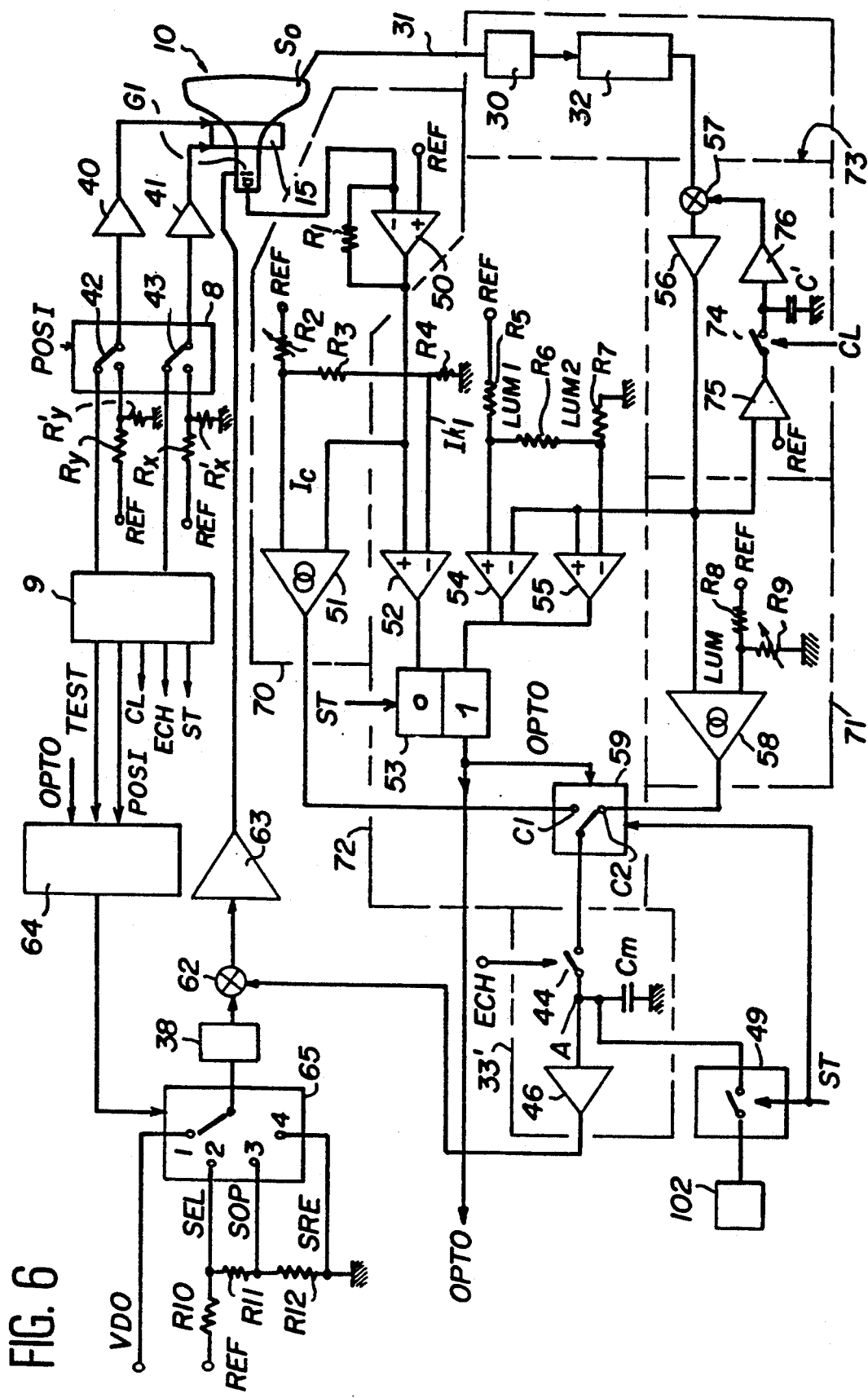
FIG. 6 is a functional diagram of a device for the servo-control of the cut-off voltage of a cathode-ray tube according to the invention.

Before describing the invention in relation with FIGS. 6 and 7, we shall describe a servo-control device implementing solely a luminance measuring loop according to the above-mentioned patent application.

This loop is aimed at modifying the cathode current Ik as a function of the measurement of the luminance of a dot of the screen located outside the part that is normally used. This dot of the screen is preferably made with a luminophore having special characteristics such as a very small rising time at 99%, for example a few microseconds.

Figure 1:
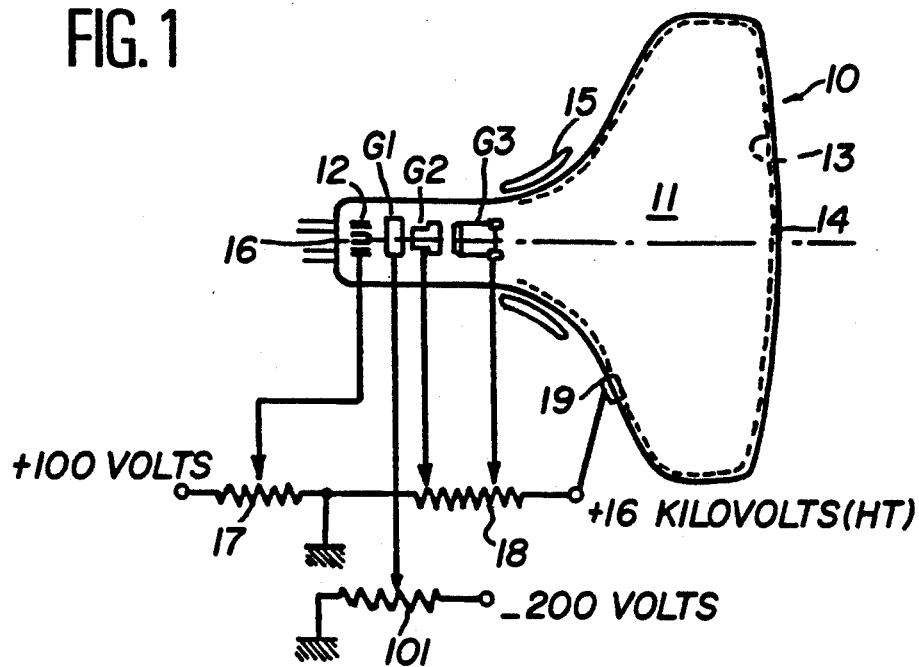
FIG. 1 is a diagram of a cathode-ray tube to which the present invention can be applied.
Figure 5:
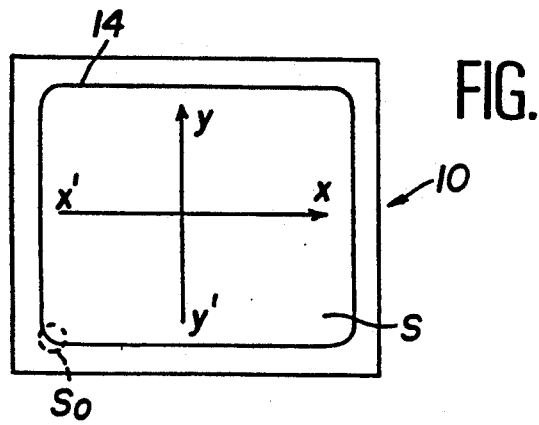
FIG. 5 is a front view of the screen 14 showing a possible position of the luminophore for the measurement of luminance.

To his effect, the screen 14 comprises (FIG. 5), in addition to a useful surface S made with the usual luminophores, a zone $S_o$ made with a luminophore Lo having characteristics suited to its role in the device according to the invention. This zone $S_o$ is located at the periphery of the screen and is not normally scanned by the electron beam emitted by the cathode to make an operational image.

The luminophore Lo of the zone $S_o$ is chosen according to the following criteria:

its wavelength should be such that any visible parasitic radiation towards the operational surface of the tube is avoided; preferably, it will be in the infrared range;

its build-up time to 99% should be as short as possible so that the duration of the measurement phase of the luminance should be as short as possible; a build-up time of the order of 10 microseconds is acceptable for a measurement during the frame flyback;

its energy yield should be as high as possible so as to servo-link the system as closely as possible to the cut-off voltage.

It will be noted that the raising time at 99% of the luminophore of the operational part S of the screen is around a few milliseconds to be compared against the raising time of a few microseconds of luminophore Lo of the zone $S_o$. It is recommended that the raising time at 99% be much smaller than the one of the luminophore of the zone S, at least one order of magnitude (ratio 10) and preferably several orders of magnitude (ratio 1000).

Figure 3:
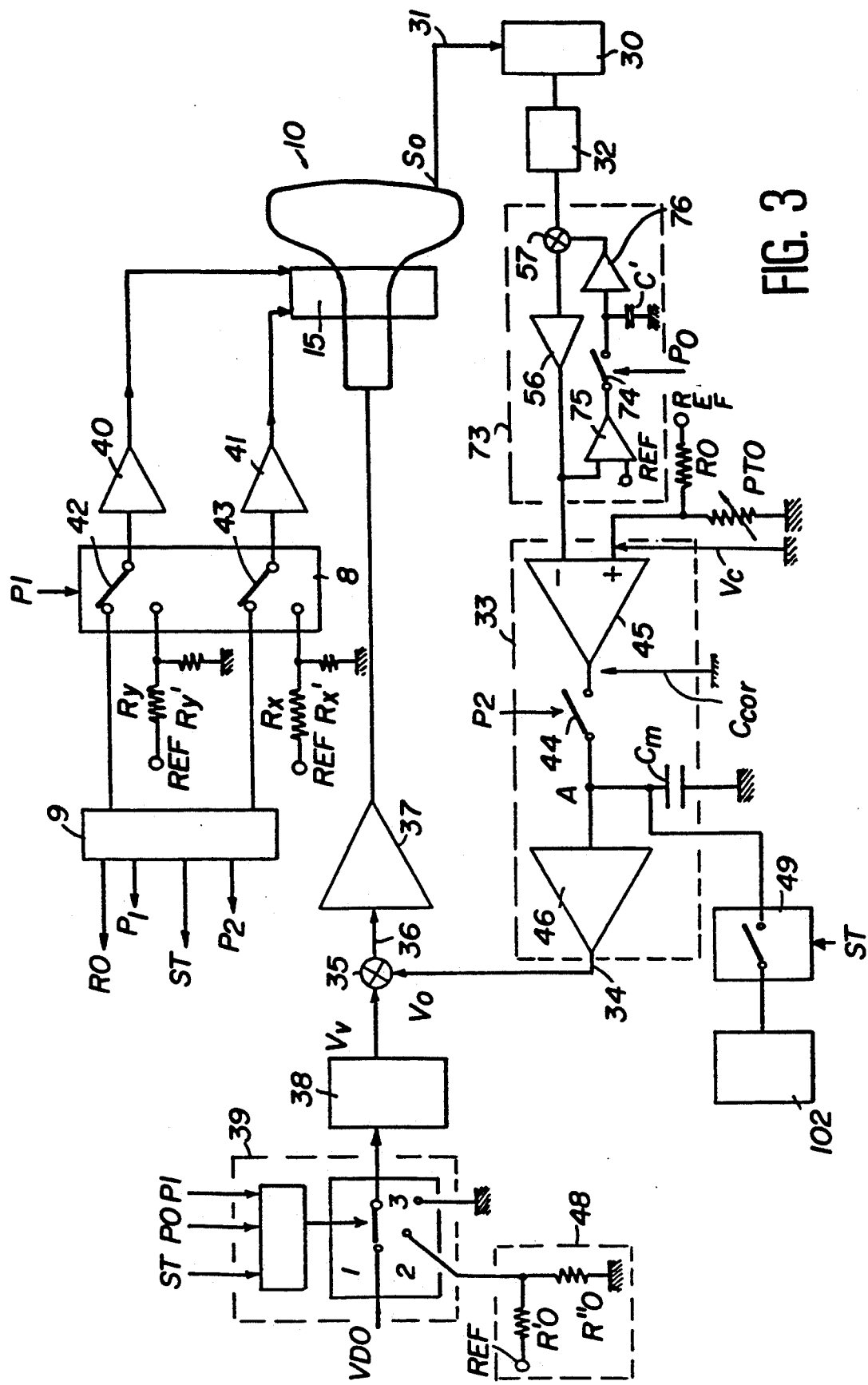
FIG. 3 is a functional diagram of a device for the servo-control of the cut-off voltage of a cathode-ray tube of the type with luminance measurement only, as described in the above-mentioned patent application.

With this zone $S_o$, there is associated a photoelectric sensor 30, of the photoconductive diode or similar type, which gives an electrical signal representing the luminance of a dot of the zone $S_o$. Naturally, the sensor 30 may be in the immediate vicinity of the zone $S_o$ or it may be at a distance therefrom and, in this case, may be connected to it by an optical fiber 31 as shown in FIG. 3.

The luminance sensor 30 should have the following characteristics:

its sensitivity should be the maximum for the wavelength of the luminophore;

its surface area should be great enough to increase the energy received and facilitate the problem of its positioning;

its parasitic capacitance should be low enough for the passband of the detection system to allow the measurement to be done swiftly.

The electrical signal given by the sensor 30 is applied to a preamplifier 32, the output signal of which is applied to a circuit 73 which eliminates the component due to the dark current of the sensor 30 from the signal.

To this effect, the circuit 73 samples the value of the dark current during the phase P0 (FIG. 4a) and this sampled value is memorized for the rest of the time to be deduced from the signal coming from the preamplifier 32.

Figure 4:
FIGS. 4a, 4b and 4c are graphs of signals used in the device of FIG. 3.
Figure 4:
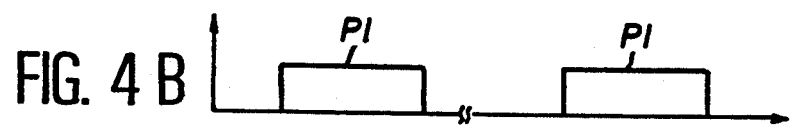
Figure 4:
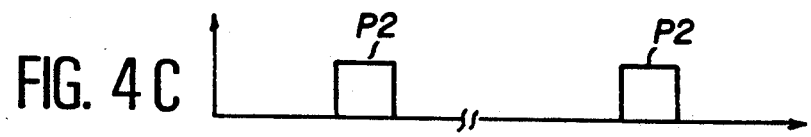

The circuit 73 may be made in different ways and notably according to the diagram indicated within the rectangle 73. It includes an amplifier 56, the negative feedback loop of which is constituted by a sample-and-hold circuit and a subtracter circuit 57. The sample-and-hold circuit comprises a first amplifier 75, one input terminal of which is connected to the output terminal of the amplifier 56 and the other input terminal of which is connected to to a reference voltage source REF. The output terminal of this first amplifier is connected to a terminal of a memory capacitor C' by means of a switch 74, the other terminal being connected to the ground. An amplifier 76 connects the capacitor C' to the subtracter circuit 57. The opening and closing of the switch 74 are activated by the phase signal P0 (FIG. 4a).

The output signal of the circuit 73 is applied to a sample-and-hold circuit 33 to be compared, in an error amplifier comparator 45, with a set value of luminance Vc that is adjusted by means of a resistive voltage divider connected between a voltage source REF and the ground and comprising a resistor R0 and a potentiometer PTO. This sample-and-hold circuit comprises, notably, the error amplifier comparator 45 which carries out this comparison and gives, at its output terminal, a correction voltage Vcor which, as shall be described further below, will enable the increasing or reducing of the cut-off voltage of the tube during the sampling phase P2 (FIG. 4c).

Through the closing of a switch 44 during this phase P2, this correction voltage Vcor is memorized in a capacitor Cm throughout the rest of the time when the switch 44 stays open.

The output stage of the sample-and-hold circuit 33 comprises an amplifier 46, the output terminal 34 of which is at a voltage $V_o$ which is equal to the charging voltage of the capacitor Cm at a point A (terminal A).

The voltage $V_o$ is subtracted from a voltage Vv corresponding to a video signal VDO in a subtracter circuit 35, the output terminal 36 of which is connected to the cathode of the cathode-ray tube 10 by means of an amplifier 37.

The video signal VDO is applied to the subtracter circuit 35 by means of a corrector circuit 38, better known as a gamma corrector circuit which has the effect of linearizing the luminance of the screen as a function of the luminance control signal constituted by the video signal.

Furthermore, the video signal is not applied permanently to the gamma corrector circuit owing to the interposition of a three-position selector 39 that enables the connection of the gamma corrector 38 and, consequently, of the subtracter circuit 35:

either to the video signal VDO in normal operation (position 1), or to the ground (position 3), or to a reference circuit 48 (position 2) during the servo-control phases.

This reference circuit 48 comprises a resistive voltage divider comprising resistors R'0 and R"0, the resistor R'0 being connected to the reference voltage REF and the resistor R"0 being connected to the ground.

The switching over of the selector 39 to the ground is obtained by the phase signal P0 (FIG. 4a) or by a signal ST when the cathode-ray tube is turned on.

The switching over of the selector 39 towards the output terminal of the reference circuit 48 is obtained by a phase signal P1 (FIG. 4b). The phase signals P0 and P1 are cyclical and may be synchronized, for example, with the scanning signals. The signal P0 precedes the signal P1 without overlapping.

With the tube 10 and, more specially, with the deflection coils 15, deflection amplifiers 40 and 41 are associated in a known way. One of these deflection amplifiers, referenced 40, is for the scanning along the x-axis X'X (FIG. 5) and the other one, referenced 41, is for the scanning along the y-axis Y'Y. These amplifiers 40 and 41 receive television or directed-beam type scanning signals from the scanning circuit 9 but, according to the invention, they also receive signals for the positioning of the electron beam for the duration of the phase signal P1 to direct said beam towards the zone $S_o$ of the screen and, more specifically, in front of the end face of the optical fiber 31.

To this end, the input terminal of each deflection amplifier 40 and 41 is respectively connected to a selector 42 and 43 of a selector circuit 8, activated by the signal P1, in such a way as to receive the scanning signals during the frame and to receive reference signals during the frame flyback or the time chosen for the test during the directed-beam trace, i.e. for the duration of the signal P1. In FIG. 3, these reference signals are created by a resistive divider circuit supplied by a reference voltage REF and comprising the resistors Rx and R'x for the deflection along the axis X'X and the resistors Ry and R'y for the deflection along the axis Y'Y.

The luminance of the zone $S_o$ of the screen is measured by the sample-and-hold circuit 33 for a part of the duration of the signal P1. To this effect, the sample-and-hold circuit 33 is controlled by a signal P2 (FIG. 4c) which appears during P1. As FIG. 3 shows, this signal P2 controls the charging of the capacitor Cm by means of the switch 44 positioned between the comparator 45 and the terminal A of the capacitor Cm, the other terminal of which is connected to the ground. The charging voltage of the capacitor Cm is applied to the subtracter 35 as described hereinabove.

Furthermore, the terminal A of the capacitor Cm is connected to a source 102 by a switch 49 activated by a signal ST so as to charge the capacitor Cm at a determined voltage when the tube 10 is turned on and so as to obtain maximum cut-off for the tube.

The signal ST as well as the signals P0, P1 and P2 are provided by the scanning circuit 9.

To obtain variation in the luminance threshold, the signal given by the sensor 30 is compared, as described here above, with a set value Vc in the error amplifier 45; this set value is obtained by a resistive divider circuit connected between the reference voltage REF and the ground and comprising the resistor R0 and the potentiometer PTO. This value Vc can be adjusted by the user to adapt the background luminance of the screen.

The tube then works as follows, assuming that the tube is in normal operation. Cyclically, for example at each frame flyback, the signal P0 switches over the selector 39 to the ground and enables the circuit 73 to sample the dark current of the sensor 30 while the beam current is almost zero and the beam is not positioned on the zone $S_o$, i.e. on the sensor 30. The circuit 73 deducts this value from the servo-control measurement which shall be done subsequently.

Then, the signal P1 activates the selectors 42 and 43 so that the electron beam excites the point of the zone $S_o$ facing the end of the fiber 31. It also activates the selector 39 so that the subtracter 35 is connected, through the gamma corrector 38, to the reference voltage source 48 (position 2).

If the luminance, which is measured by the sensor 30, is greater than the set value Vc, the capacitor Cm gets discharged, for example during the signal P1, and the voltage of the point A decreases; this has the effect, through the amplifier 46 and the subtracter 35, of decreasing the cathode current Ik and hence of increasing the difference in potentials VKG1, the effect of which is to decrease the electron current of the tube and hence the luminance of the tube.

It will be understood that the reverse effect is obtained when the luminance measured by the sensor 30 is smaller than the set value Vc.

When the voltage is turned on in the tube, it is important for the tube to be cut off to the maximum and the result thereof is that, according to the operation described here above, the voltage at the point A should be the minimum: this is the role of the source 102 which may be zero or negative and which, when the voltage is turned on, is connected to the point A by the closing of the switch 49 through the signal ST. For the same reason, the signal ST also activates the switch 39 to connect the gamma corrector 38 to the ground (position 3).

The device of FIG. 3 has the major drawback of leading to the destruction of the tube in the event of malfunctioning of the scanning systems or of an element of the loop such as the sensor. Hence the invention provides, firstly, for improving this optical type of loop and for combining it with a second loop using the cathode current.

Thus, any serious anomaly in the optical measuring sequence or any major error in the positioning of the spot will be detected. The device delivers a signal indicating the presence of an anomaly.

In FIG. 6, the elements identical to those of FIG. 3 bear the same references and shall not be described again.

In the device according to the invention, the modification of the cut-off voltage of the tube is obtained by modifying the potential VG1 of the Wehnelt gate, either through a measurement of the cathode current Ik done by the circuit 70 or through a measurement of the luminance of the screen done by a circuit 71, the selection being done by a selector circuit 72.

The circuit 70 comprises an operational amplifier 50, the negative input terminal of which is connected to the cathode of the tube and the positive input terminal of which is connected to the reference voltage source REF. A negative feedback resistor R1 is connected between the negative input terminal and the output terminal of this amplifier. The output terminal of the amplifier 50 is connected, firstly, to a first input terminal of an amplifier 51 of the current generator type and, secondly, to a positive input terminal of a comparator 52 of the selector circuit 72. The other input terminal of the current generator 51 is connected to the common point of resistors R2 and R3 of a voltage divider circuit, the resistor R2 of which is connected to the reference voltage source REF. The negative input terminal of the comparator 52 is connected to the common point of the resistors R3 and R4 of the above-mentioned voltage divider circuit, the resistor R4 being connected to the ground. This voltage divider circuit actually gives two threshold voltages, one corresponding to a value Ic, called a set value, of the cathode current that is applied to the current generator 51 and the other corresponding to a threshold value Ik1 of the cathode current which is applied to the comparator 52.

In addition to the elements that it has in common with the diagram of FIG. 3, namely the luminance sensor 30, the optical fiber 31 and the preamplifier 32, the circuit 71 comprises a circuit 73 for the restoration of the dc component to which there is applied the output signal of the preamplifier 32, the output terminal of this circuit 73 being connected, firstly, to comparators 54 and 55 and, secondly, to a current generator 58.

The dc component restoration circuit 73 can be made in different ways, notably according to the diagram indicated inside the rectangle 73. As indicated hereinabove with reference to FIG. 3, it has an amplifier 56, the negative feedback loop of which is constituted by a sample-and-hold circuit and a subtracter circuit 57. The sample-and-hold circuit has a first amplifier 75, one input terminal of which is connected to the output terminal of the amplifier 56 and the other input terminal of which is connected to the reference voltage source REF. The output terminal of this first amplifier is connected to a terminal of a memory capacitor C' by means of a switch 74, the other terminal being connected to the ground. An amplifier 76 connects the capacitor C' to the subtracter circuit 57. The opening and closing of the switch 74 are activated by the signal CL which shall be defined hereinafter and is different from the signal P0 of FIG. 3.

The dc component restoration circuit 73 is aimed at taking account of the dark current of the sensor 30 during the measurement of the luminance by measuring this current, closing the switch 74, and keeping this value of the dark current memorized in the capacitor C' to subtract it, in the circuit 57, from the current of the sensor measured in the presence of an electron beam. Such a circuit enables the measurement of very low values of luminance current as compared with the dark current of the sensor.

The second input terminal of the current generator 58 is connected to the common point of the resistors R8 and R9 (variable) of a voltage divider circuit, the resistor R8 of which is connected to the voltage source REF. This divider circuit can be used to adjust the luminance threshold LUM of the device of the invention so as to give to the amplifier 58 a proportional signal when the output signal of the amplifier 56 is greater than this luminance threshold LUM.

The comparator 54 has a negative terminal that is connected to the output terminal of the amplifier 56 and a positive terminal that is connected to the common point of resistors R5 and R6 of a voltage divider circuit, the resistor R5 of which is connected to the source REF while the resistor R6 is connected to the ground by means of a resistor R7.

Figure 2:
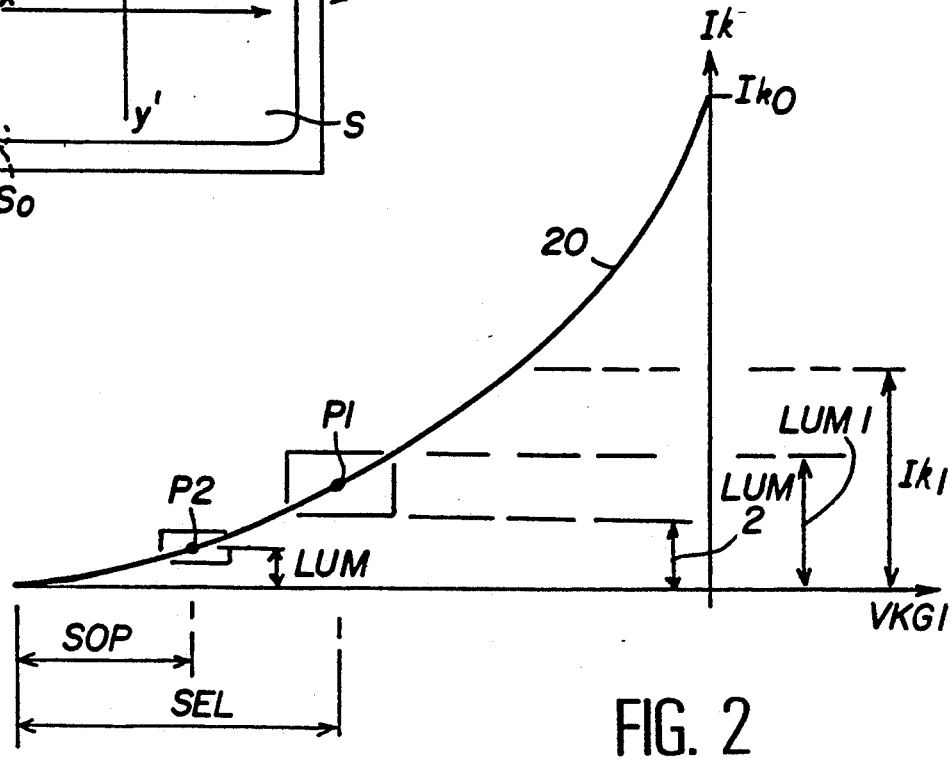
FIG. 2 is a graph showing the curve of variation of the cathode current of the tube as a function of the voltage applied to the Wehnelt gate.

The comparator 55 has a positive terminal that is connected to the output terminal of the amplifier 56 and a negative terminal that is connected to the common point of the resistors R6 and R7. The divider circuit therefore gives two comparison voltages, each corresponding to a luminance threshold LUM1 for the comparator 54 and to a luminance threshold LUM2 for the comparator 55, the staging of the thresholds being such that LUM1 is greater than LUM2 (FIG. 2).

In addition to the comparators 52, 54 and 55, the selection circuit 72 has a two-position selector 59 and a bistable circuit 53 which controls the positioning of the selector in one of the two positions C1 or C2. The input terminal C1 of the selector 59 is connected to the output terminal of the current generator 51 while the other input terminal C2 is connected to the output terminal of the current generator 58. The bistable circuit 53 is placed in the state $\underline{0}$ by the output signal of the comparator 52 when the cathode current Ik is greater than Ik1 and this state places the selector 59 in the position C1. The bistable circuit 53 is put in the state $\underline{1}$ by the output signals from the comparators 54 and 55 when the luminance signal is included within the interval defined by LUM1 and LUM2 and this state places the selector 59 in the position C2.

The output terminal of the selector 59 is connected to the sampling device 33' which is similar to the device 33 described with reference to FIG. 3 and therefore includes the amplifier 46, the input terminal of which is connected to the output terminal of the selector 59 by means of the switch 44. The output terminal of the amplifier 46 is connected to the Wehnelt gate by means of an amplifier 63, known as a Wehnelt amplifier, preceded by a subtracter circuit 62 which furthermore receives electrical signals that are different depending on the state of operation of the device. These electrical signals are applied by means of a selector 65 which is activated by the signals given by a logic circuit 64.

The signals that are commutated are the following:

the video signal VDO (position 1) which is normally applied to the tube to make the corresponding image appear;

a first reference signal SEL (position 2), known as an electrical stimulation signal, that corresponds to the set value Ic of the cathode current applied to the input of the current generator 51;

a second reference signal SOP (position 3), known as an optical stimulation signal, which corresponds to the set value LUM of the luminance applied to the input of the current generator 58;

a third reference signal SRE (position 4), known as a dc component restoration signal, which corresponds to the zero value of the video signal, namely the potential of the ground.

The logic circuit 64 gives the control signals for the selector 65 from the following signals:

a logic signal referenced TEST (FIG. 7a), the value $\underline{0}$ of which indicates that the tube receives the video signal, the value $\underline{1}$ then corresponding to the interval reserved for the periodic adjustment of the servo-control device according to the invention; this signal TEST has, for example, the periodicity of the frame signal and a duration of 200 microseconds, and is given by the scanning circuit 9;

a logic signal referenced POSI (FIG. 7c), the value 1 of which indicates that the electron beam is deflected towards the zone $S_o$ so as to make it possible to carry out a measurement of luminance; this signal is also given by the scanning circuit 9 for the duration of the signal TEST;

a logic signal referenced OPTO which is given by the bistable circuit 53, the value $\underline{1}$ of which corresponds to the state 1 of the bistable circuit 53, this value 1 indicating that the servo-control device works in the optical servo-control zone (position C2).

The scanning circuit 9 furthermore gives the following signals:

a logic signal CL, the value $\underline{1}$ (FIG. 7b) of which corresponds to the dc component restoring operation; this signal appears at the start of the signal TEST and ends before the appearance of the signal POSI defined hereinabove, and has the effect of closing the switch 74 of the circuit 73;

a signal ECH (FIG. 7d) at the end of the signal POSI to close the switch 44 of the sampling circuit 33' so as to take account of the measurement of luminance;

a signal ST used for the initialization and to place the bistable circuit 53 in the state $\underline{0}$, which corresponds to a servo-control on the cathode current, and to discharge the capacitor Cm of the sampling device 33' so that the potential of the Wehnelt gate is as negative as possible in comparison with that of the cathode.

The device of the invention then works as follows in continuous steady operation, it being known that the selector 59 is in the position C2 which connects the current generator 58 to the sampling circuit 33'.

At regular intervals, for example at each frame flyback, the signal TEST disconnects the video signal VDO which is then no longer applied to the Wehnelt gate of the tube: the tube will be excited only by one of the signals SEL, SOP or SRE depending on the position of the selector 65.

The signal CL closes the switch 74 and thus makes it possible to carry out a measurement of the dark current of the tube and of the sensor which is memorized by the capacitor C'$_i$ after the opening of the switch 74. The dark current of the tube is defined by the application of the signal SRE by the position 4 of the selector: namely the potential of the ground.

The signal POSI that follows activates the switches 42 and 43 so as to deflect the electron beam towards the zone $S_o$ of the optical fiber 31; furthermore, in combination with the signal OPTO, it places the selector 65 in position 3 so as to apply a signal SOP to the Wehnelt gate, this signal corresponding to the set value of luminance LUM at the input of the current generator 58. The signal detected by the sensor 30 is compared with the signal memorized in the capacitor C' in such a way that the output signal of the dc component restoration circuit 73 represents the luminance due to the electron beam modulated by the signal SOP. Depending on whether this signal is greater or lower than the set value LUM, it modifies the potential of the Wehnelt gate in the requisite direction to bring the detected signal towards the set value LUM. This modification is obtained through the generator 58, the position C2 of the selector 59, the sampling circuit 33', the subtracter circuit 62 and the amplifier 63.

In the event of malfunctioning of the optical sequence, for example a failure of the sensor or a wrong positioning of the impact of the electron beam in relation to the optical fiber, the output signal of the circuit 71 would be erroneous so that the potential of the Wehnelt gate would become more positive at each measurement and would lead to the destruction of the tube. To prevent this, as soon as the cathode current goes beyond the threshold Ik1, the output signal of the comparator 52 places the bistable circuit 53 in the state 0, thus placing the selector 59 in the position C1 so that the servo-control is obtained by the measurement of the cathode current with a set value Ic.

In the event of servo-control by the cathode current, the selector 65 is placed in the position 2 so that the signal SEL is applied to the subtracter circuit 62 during the measurement of the dark current.

The set value SEL is far greater than the set value SOP for the measurement made on the cathode current is a very rough measurement.

The system can return to servo-control by optical measurement if the output signal of the circuit 73 remains between the thresholds LUM1 and LUM2, in which case the bistable circuit goes to the state 1 and places the selector 59 in the position C2. Furthermore, the selector 65 is placed in the position 3 in such a way that the signal SOP is used during the measurement of the dark current.

When the tube is turned on, the signal ST short-circuits the capacitor Cm. This has the consequence of determining a Wehnelt voltage that is highly negative with respect to the cathode, corresponding to a value beyond the cut-off level of the tube. The signal ST places the bistable circuit 53 in the state 0. This places the selector 59 in the position C1 so that the servo-control is done by the measurement of the cathode current. The operation point goes to P1 (FIG. 2) firstly and then to P2 after the switching of the bistable circuit 53 by the effect of the thresholds LUM1 and LUM2.

Should an anomaly (such as a scanning amplifier error, an exaggerated drift of the high voltage, malfunctioning of the optical sensor etc.) prompt a break in the measuring chain, the value of the information element coming from this sequence would be far too small in relation to the set value and the servo-control would tend to increase Ik.

Starting from the instant when Ik reaches the threshold Ik1, the bistable circuit would switch the servo-control system over to the measurement of the cathode current. Since the luminance measuring sequence would be broken, the value of the information read would be almost certainly smaller in value than the threshold LUM1 and the bistable circuit would remain in this position, thus informing the system of the presence of the anomaly.

In the very unlikely event that the value of the information' is between LUM1 and LUM2, there would be a cyclical switching over of the bistable circuit.

The invention has been described as comprising two luminophores that are different but it applies also to a device using only one luminophore, one which corresponds to the operational part of the screen but in such an embodiment, advantage cannot be taken of the features resulting from using the second luminophore Lo, such as a higher sensitivity.

What is claimed is:

1. A device for the servo-control of a cut-off voltage of a cathode-ray tube, said device comprising:
   a cathode-ray tube having a screen which has at least a first zone used to make images appear on the screen and a second zone positioned outside the first zone, a luminescent material covering said second zone;
   a luminance sensor facing the second zone to measure luminance of the second zone;
   scanning means to direct an electron beam of the cathode-ray tube, at certain chosen instants, towards said second zone; and
   means to modify the cut-off voltage;
   wherein the last-named means further comprises:
     a first servo-control loop to modify the cut-off voltage as a function of a cathode current, said first servo-control loop having an output;
     a second servo-control loop to modify the cut-off voltage as a function of the luminance measurement given by said luminance sensor, said second servo-control loop having an output; and
     selector means to change between the first servo-control loop and the second servo-control loop as a function of the cathode current and of the luminance measurement.

2. A device for the servo-control of the cut-off voltage of a cathode-ray tube, the screen of which has at least a first zone of the tube used to make images appear on the screen and a second zone positioned outside the first zone, said device comprising a luminance sensor that is positioned facing the second zone to measure the luminance of the associated surface of the second zone, scanning means to direct an electron beam of the tube, at certain chosen instants, towards said associated surface of the sensor and means to modify the cut-off voltage of the tube, wherein the last-named means further comprises:
   a first servo-control loop to modify the cut-off voltage of the tube as a function of the value of the cathode current;
   a second servo-control loop to modify the cut-off voltage of the tube as a function of the value of the luminance given by said luminance sensor; and
   selector means to change over from the first loop to the second loop and vice versa as a function of the values of the cathode current and of the luminance; said selector means comprises:

i. a two-position selector, a first input terminal of which is connected to the output terminal of the first servo-control loop and a second input terminal of which is connected to the output terminal of the second servo-control loop; and
ii. a circuit for the controlling of said selector comprising a bistable circuit, the state $\underline{1}$ or $\underline{0}$ of which is determined by output signals of comparators to which there are applied, firstly, the signals representing the cathode current and the luminance values and, secondly, predetermined threshold values.

3. A device according to claim 1, wherein the output of said first or said second servo-control loops is applied to a Wehnelt gate by means of a subtracter circuit having a first input to which a video signal is applied.

4. A device according to claim 1, wherein the output of said first or said second servo-control loop is applied to a Wehnelt gate by means of a subtracter circuit, and a means for applying a bias signal is connected to a first input of said subtracter circuit.

5. A device according to claim 4, wherein the means for applying said bias signal includes:
a resistive voltage divider circuit;
a selector circuit, a first input terminal of which is connected to said resistive voltage divider and a second input terminal of which is connected to a video signal circuit, and an output terminal of which is connected to a first input of the subtracter circuit; and
a logic control circuit for said selector circuit.

6. A device according to claim 2, wherein the bistable circuit is also controlled by an initialization signal in such a way as to position said bistable circuit in a state such that the first servo-control loop is in operation when said initialization signal is present.

7. A device according to claim 2, wherein the bistable circuit is controlled by the output signals of the first and the second comparators so as to position said bistable circuit in a state such that the second servo-control loop is in operation when said luminance measurement is between said predetermined threshold values.

8. A device according to any of the claims 2 to 7, wherein the bistable circuit is controlled by the output signal of a third comparator receiving a threshold voltage so as to position said bistable circuit in a state (state $\underline{0}$) such that the first servo-control loop works on the cathode current measurement when said current extends the threshold.

9. A device according to claim 1, wherein the selector means comprises:
a two-position selector, a first input terminal of which is connected to said output terminal of said first servo-control loop and a second input terminal of which is connected to said output terminal of said second servo-control loop; and
a means for controlling said two-position selector comprising a bistable circuit, the state of which is determined by an output of a third comparator, said third comparator causing said first servo-control loop to be in operation when said luminance measurement exceeds a predetermined threshold.

10. A device according to claim 2, wherein the output of said first or said second servo-control loops is applied to a Wehnelt gate by means of a subtracter circuit having a first input to which a video signal is applied.

11. A device according to claim 3, wherein a means for applying a bias signal is connected to a second input of said subtracter circuit.

12. A device according to claim 10, wherein a means for applying a bias signal is connected to a second input of said subtracter circuit.

13. A device according to claim 3, wherein the bistable circuit is also controlled by an initialization signal i such a way as to position said bistable circuit in a state such that the first servo-control loop is in operation when said initialization signal is present.

14. A device according to claim 4, wherein the bistable circuit is also controlled by an initialization signal in such a way as to position said bistable circuit in a state such that the first servo-control loop is in operation when said initialization signal is present.

15. A device according to claim 5, wherein the bistable circuit is also controlled by an initialization signal in such a way as to position said bistable circuit in a state such that the first servo-conical loop is in operation when said initialization signal is present.

16. A device according to claim 3, wherein said bistable circuit is controlled by said output signals of said first and said second comparators so as to position said bistable circuit in a state such that said second servo-control loop is in operation when said luminance measurement is between said predetermined threshold values.

17. A device according to claim 4, wherein said bistable circuit is controlled by said output signals of said first and said second comparators so as to position said bistable circuit in a state such that said second servo-control loop is in operation when said luminance measurement is between said predetermined threshold values.

18. A device according to claim 5, wherein said bistable circuit is controlled by said output signals of said first and said second comparators so as to position said bistable circuit in a state such that said second servo-control loop is in operation when said luminance measurement is between said predetermined threshold values.

19. A device according to claim 6, wherein said bistable circuit is controlled by said output signals of said first and said second comparators so as to position said bistable circuit in a state such that said second servo-control loop is in operation when said luminance measurement is between said predetermined threshold values.

* * * * *